(No Model.)
H. E. SMYSER.
WEIGHING APPARATUS FOR GRANULAR AND POWDERED SUBSTANCES.
No. 376,683. Patented Jan. 17, 1888.
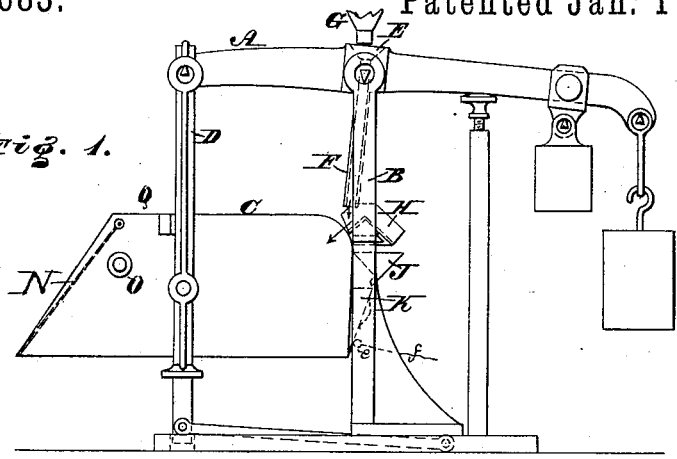
Fig. 1.
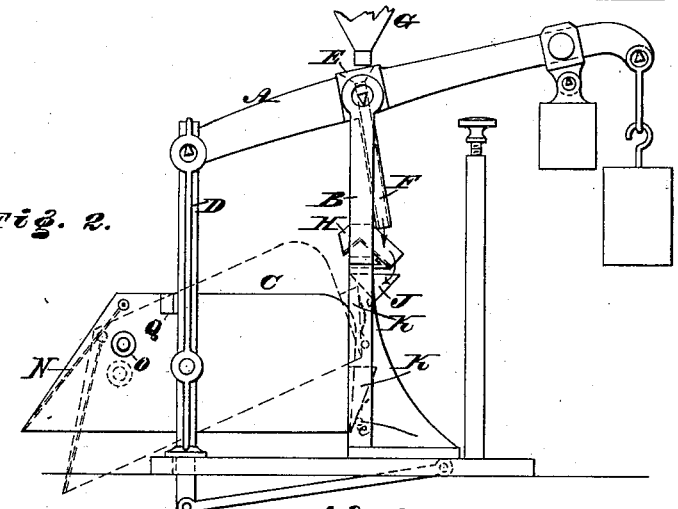
Fig. 2.
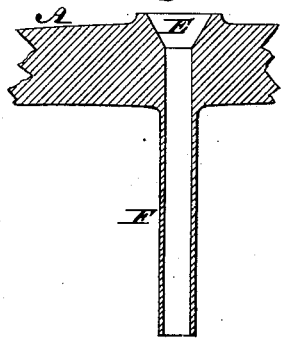
Fig. 4.
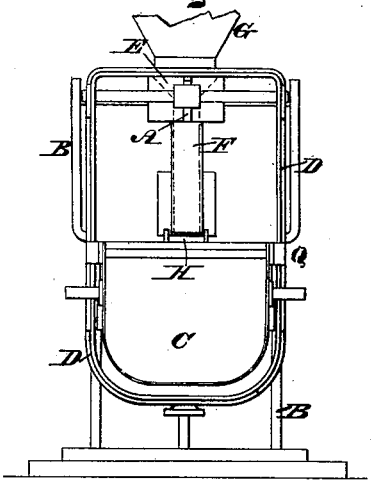
Fig. 3.
Fig. 5.
WITNESSES:
James F. Kelly
L. Douville
INVENTOR:
Henry E. Smyser
BY John A. Wiedersheim
ATTORNEY.
N. PETERS, Photo-Lithographer, Washington, D. C.

UNITED STATES PATENT OFFICE.

HENRY E. SMYSER, OF PHILADELPHIA, PENNSYLVANIA.

WEIGHING APPARATUS FOR GRANULAR AND POWDERED SUBSTANCES.

SPECIFICATION forming part of Letters Patent No. 376,683, dated January 17, 1888.

Application filed May 10, 1887. Serial No. 237,788. (No model.)

*To all whom it may concern:*

Be it known that I, HENRY E. SMYSER, a citizen of the United States, residing in the city and county of Philadelphia, State of Pennsylvania, have invented a new and useful Improvement in Weighing Apparatus, which improvement is fully set forth in the following specification and accompanying drawings.

My invention consists of a weighing apparatus or scale having means for automatically cutting off the supply of material to the tray, as will be hereinafter set forth.

It also consists of means for automatically loading the scale for preventing vibrations of the beam.

Figures 1 and 2 represent side elevations of a weighing apparatus embodying my invention. Fig. 3 represents an end view thereof. Fig. 4 represents a section of part of the scale-beam and connection on an enlarged scale. Fig. 5 represents a vertical section of part of the pan or tray and connection on an enlarged scale.

Similar letters of reference indicate corresponding parts in the several figures.

Referring to the drawings, A represents a scale-beam, which is mounted on the standard B, and having the tray C pivoted to the arms D, which depend from the knife-edges at one end of said beam. In the axial portion of the beam A is an opening, E, and below the same is a depending tube, F, which communicates with said opening and is secured to the beam so as to vibrate therewith, the opening being also in communication with the hopper G, which is supported above the beam.

H represents a chute, which is double-inclined, or of the form of an inverted V, or may be the segment of a circle, and is secured to the standard B below the beam A. To the standard is also secured a deflector, J, of the form of a hopper, which is located below the chute and adapted to receive material to be weighed from one end of the chute H.

Connected with the tray at the end adjacent to the standard B is a pocket, K, which is formed of side pieces, *a*, secured to the tray, and a gate, *b*, which is pivoted at its upper end to the top cross-piece, *c*, of the pocket, so that said gate is permitted to open at bottom, which opening may be accomplished by means of a cord, *f*, secured to the ring *e* of the gate, or in some other well-known manner. A spring, *d*, bears against the gate *b* for holding it in closed position.

Q represents stops secured to the sides of the tray C, and adapted, by bearing against the arms D, to hold the tray in horizontal position during the loading thereof. Pivotally connected to the tray, at the front end thereof, is a gate or door, N, which is closed except when the tray is tilted for unloading.

O are handles or projections on the sides of the tray, serving as aids in tilting the said tray.

The operation is as follows: Material to be weighed is placed in the hopper G and directed into the opening E, by which it is discharged on the face of the chute toward the tray, and thus caused to enter the latter. (See Fig. 1.) When the proper quantity of material is weighed, the tray descends and the angle of the tube F changes, so that its lower end is above the other face of the chute, (see Fig. 2,) whereby the material is directed on said face and caused to enter the deflector J, from whence it drops into the pocket K, thus loading the tray to such extent that it drops to its full extent, whereby vibrations of the scale-beam are prevented.

The tray may now be readily tilted on its bearing, so that the contents thereof may be discharged from the front thereof.

As the material continues to be supplied to the deflector J, it may drop therefrom into a box or pan suitably located below the same. The gate *b* is then opened, whereby the material in the pocket is discharged, and may also be directed into said box or pan. The tray now rises and the parts are restored to their first position, whereby the material is again directed into the tray and the weighing continues.

Having thus described my invention, what I claim as new, and desire to secure by Letters Patent, is—

1. A scale-beam having an opening therein, in combination with a tube leading from said opening, a hopper above said opening, a chute below said tube, and a tray, substantially as and for the purpose set forth.

2. A weighing apparatus having an inclined chute, a deflector, and a tube connected with the beam, located above said chute, and a tray whereby the material to be weighed may be directed both into the tray and outside of the same, substantially as described.

3. A scale-tray provided with a pocket outside of the same, in combination with a deflector supported above said pocket, and means for directing material to be weighed into said pocket.

4. A scale-tray having a pocket outside of the same, the same consisting of a gate which is pivoted at top to the tray and provided with a closing-spring, substantially as described.

5. In a weighing apparatus, a scale-beam having an opening therein, in combination with a tube communicating with the said opening, substantially as and for the purpose set forth.

H. E. SMYSER.

Witnesses:
 THEOP. H. SMITH,
 H. C. WHEATON.